Sept. 4, 1923.  
W. J. PAGE  
CANT HOOK  
Filed May 13, 1922  
1,467,192  
2 Sheets-Sheet 1

Inventor  
William J. Page  
By Herbert E. Smith  
Attorney

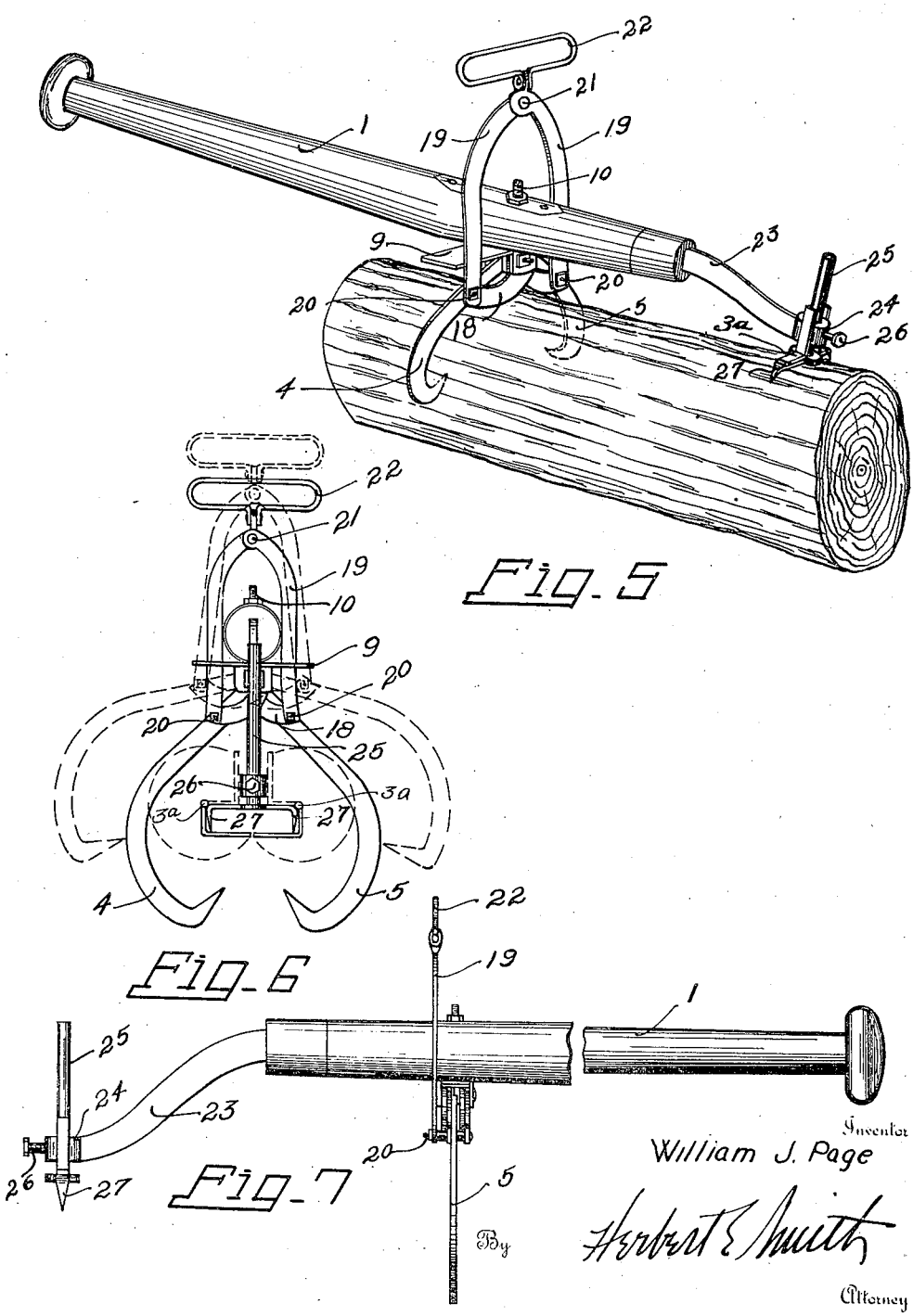

Patented Sept. 4, 1923.

1,467,192

UNITED STATES PATENT OFFICE.

WILLIAM J. PAGE, OF COEUR D'ALENE, IDAHO.

CANT HOOK.

Application filed May 13, 1922. Serial No. 560,562.

*To all whom it may concern:*

Be it known that I, WILLIAM J. PAGE, a citizen of the United States, residing at Coeur d'Alene, in Kootenai County and State of Idaho, have invented certain new and useful Improvements in Cant Hooks, of which the following is a specification.

The present invention relates to improvements in cant hooks for handling logs, poles, timber, railway ties, rails, &c., and is especially adapted as a carrier for such objects. The device is of that type wherein a lifting lever is provided with a pair of hooks, or double cant hooks, located intermediate its length, and having a fixed support on the lever. Usually two of the devices are employed as means for lifting and carrying a railway tie, for instance, and by the utilization of these combined lifters and carriers, the labor involved is materially decreased, and convenience is insured in the handling of the tie.

The invention consists in certain novel combinations and arrangements of parts as will be hereinafter more fully described and claimed. In the accompanying drawings I have illustrated one complete example of the physical embodiment of my invention, and a modification thereof, wherein the parts are combined and arranged according to satisfactory modes I have thus far devised for the practical application of the principles of my invention.

Figure 5 is a view similar to the implement in Figure 1 illustrating the adjustable and interchangeable fulcrum prongs for engagement with a log, and also showing a modified form of the hook release device.

Figure 6 is a front end view of the implement of Figure 4 showing in dotted lines the pairs of hooks in released position.

Figure 7 is a side view of the implement of Figs. 5 and 6.

Figure 1:
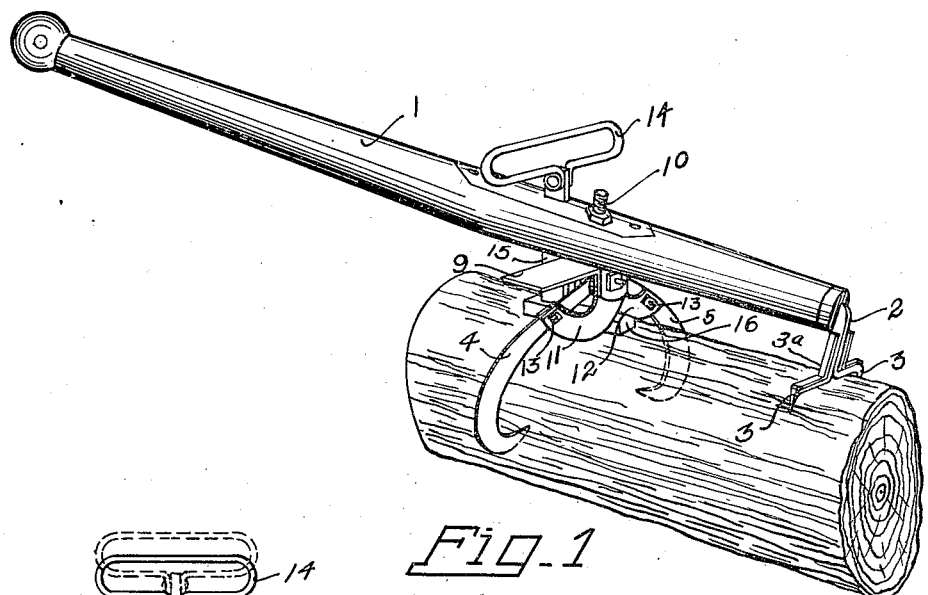
Figure 1 is a perspective view showing the utilization of one of the devices attached at the end of a log and in position for use.

In both forms of the invention the implement includes a lever 1 in the form of a wooden bar, and in the implement of Figure 1, at its forward end this lever is provided with angular posts 2 firmly secured in the lever, and fashioned with a pair of prongs 3 adapted to impinge in the surface of a log or tie, as in Figure 1. For use with objects where it is undesirable that these sharp prongs should enter the object, as for instance a box or bale, I employ angle arms 3ª that are hinged at 3' to the prongs or prong members. In Figure 1 these angle arms are illustrated in retracted position, while in Figure 2 they are shown turned outwardly and downwardly to afford a fulcrum for the lever to cause engagement of the cant hooks 4 and 5.

Figure 2:
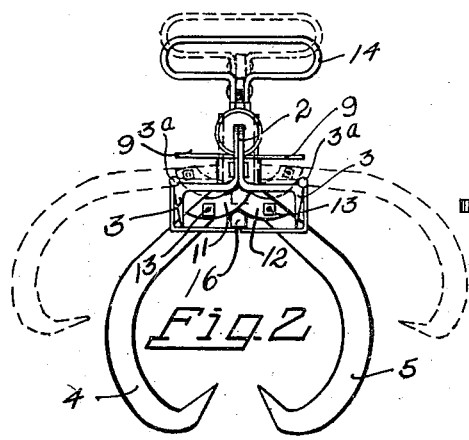
Figure 2 is a vertical or end view of the implement showing the released or open position of the cant hooks in dotted lines, and the closed position in full lines.
Figure 3:
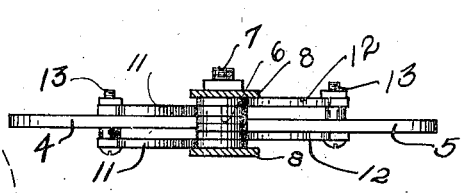
Figure 3 is a detail top plan view of the hooks and connections, the hangers for the hooks being shown in section.
Figure 4:
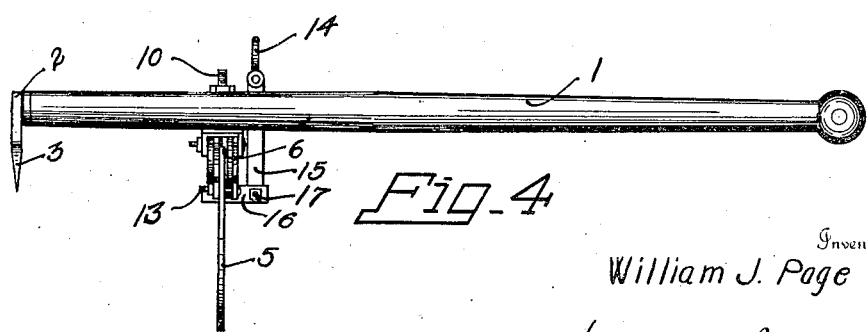
Figure 4 is a side view of the implement involving my invention.

These double cant hooks 4 and 5 are arranged in complementary positions, and at their joined ends are each fashioned with an eye as 6 through which the pivot or hinge bolt 7 is passed. The pivot bolt is supported in hangers 8 forming integral parts of a yoke with laterally extending flat plates 9, and the yoke is secured to the lever by means of a bolt 10 passing through the lever and through the yoke. As seen by dotted lines in Figure 2 these side plates 9 are designed to limit the opening movement of the hooks as they swing on their pivot bolt 7, and they form abutments for the hooks as will be understood. For bracing and guiding the hooks I employ two pairs of links 11 and 12, each link pivoted at 13 to its hook and also pivoted on the pivot bolt 7 as best seen in Figure 3, and these braces, while permitting freedom of movement of the hooks, maintain them in operative position, and hold them against wabbling.

In Figure 1 the implement has been applied to a log and it will be seen that the prongs 3 have penetrated the log, while the hooks have been dropped over and spread out to engage the log, in order that the power of lifting and carrying may be applied through the hooks with the attached prongs as a fulcrum.

For convenience in releasing the hooks I employ a handle 14 at the upper end of a shank 15 which latter is slidable through an opening or slot in the lever bar as shown in Figure 1. At its lower end, beneath the suspension bolt 7 of the hooks, the shank is equipped with a dog 16 extending parallel with the lever bar, and secured to the shank as by a bolt 17. The dog projects under the curved or convex edges of the pairs of links 11 and 12, as seen in Figure 2, and it will be apparent that by pulling upwardly on the handle 14, the lifting action of the dog will result in spreading or separating the hooks from the full line position to the dotted line position of Figure 2, thus releasing the hooks from a log or tie. With an implement at each end of the tie or log and a man to handle each implement, it will be apparent that the log may be lifted and carried with convenience and with comparatively slight expenditure of labor.

In Figures 5, 6, and 7, the bracing links 18 have spreader arms 19 pivoted thereto at the pivot or hinge 20 with the hooks, and these arms, which are pivoted together above the lever bar at 21 are provided with a handle 22. In this arrangement of parts, a pull upwardly on the handle 22 will disengage the hooks from the log and cause said hooks to swing to the dotted line position of Figure 6, thus freeing the implement from the log.

A modification of the fulcrum device is also shown in these figures, wherein an extension shank 23, of metal is secured at the fulcrum end of the lever, and fashioned with a perpendicular, open head 24 in which a post 25 is adjustable. The post 25 may be slid up or down in the head to adjusted position to vary the height of the fulcrum device, and by means of a set screw or bolt 26, the post and head are rigidly held together.

The prongs 27 are rigid with the post, and of course are moved when the post is moved to adjusted position within the open head. The interchangeable, blunt, fulcrum members 3ª are also illustrated as hinged to the adjustable prongs 27, and are used as in the implement of Figure 2.

It will be apparaent that when the lever is held in one hand, the other hand may be applied to handle 14 or handle 22, as the case may be, and by manipulating the release handle, the hooks may be spread or separated as desired to fit over a log or tie, and then be caught in the tie with facility and convenience. And by proper manipulation of either of these handles, the implement may readily be freed from a log or tie. With the angle arms 3ª turned to position of Figure 2, the prongs are covered, and the flat sectional plate formed by these arms is especially adapted for use when the implement is employed in handling baled hay, straw, and similar material.

Having thus fully described my invention, what I claim as new and desire to secure by Letters Patent is:—

1. The combination with a lever-bar, of a yoke secured thereto and a pair of cant hooks pivoted in said yoke, side plates on the yoke to limit the opening movement of said hooks, links pivotally connecting said hooks with the pivot yoke, and means for spreading said links to open the hooks.

2. The combination with a lever bar and a pair of pivoted hooks, of links pivoted to said hooks and to a yoke and having convex curved edges, and means carried by the lever bar adapted to engage said edges and spread the hooks.

3. The combination with a lever bar and a yoke carried thereby, of a pair of hooks pivoted in said yoke, pivoted links connecting said hooks and the pivotal yoke, side plates on the yoke to limit the opening movement of the hooks, and means for opening said hooks.

4. The combination with a lever bar of a yoke having a bolt for attachment to the bar, of a pair of cant hooks, a pivot bolt in said yoke for the hooks, links arranged in pairs and pivotally connecting the respective hooks with said pivot bolt, means carried by the bar for spreading said hooks and links, and means on the yoke for limiting the spreading movement of the hooks.

5. The combination with a lever bar having a pair of pivoted cant hooks, of a fulcrum member on the bar having prongs, and interchangeable fulcrum devices supported from said member for covering said prongs.

6. The combination with a lever bar having a pair of cant hooks pivoted thereto, of a fulcrum device comprising a shank and angularly disposed prongs thereon, and a pair of angle arms pivoted on said prongs, for the purpose described.

In testimony whereof I affix my signature.

WILLIAM J. PAGE.